United States Patent [19]
Kang et al.

[11] Patent Number: 5,108,025
[45] Date of Patent: Apr. 28, 1992

[54] CERAMIC-METAL COMPOSITE ARTICLE AND JOINING METHOD

[75] Inventors: Shinhoo Kang, Wayland; John H. Selverian, Burlington; Hans J. Kim, Concord; Edmund M. Dunn, Lexington, all of Mass.; Kyung S. Kim, Barrington, R.I.

[73] Assignee: GTE Laboratories Incorporated, Waltham, Mass.

[21] Appl. No.: 703,079

[22] Filed: May 20, 1991

[51] Int. Cl.[5] .................................................. B25G 3/34
[52] U.S. Cl. .................................... 228/122; 403/168; 403/172; 403/404
[58] Field of Search ............... 403/268, 272, 361, 404; 228/122, 124

[56] References Cited

U.S. PATENT DOCUMENTS

| | | | |
|---|---|---|---|
| 3,868,750 | 3/1975 | Ellis et al. | 228/122 X |
| 4,614,453 | 9/1986 | Tsuno et al. | 403/30 |
| 4,685,822 | 8/1987 | Pelton | 403/404 X |
| 4,690,617 | 9/1987 | Oda et al. | 416/421 B |
| 4,697,325 | 10/1987 | Kamagito et al. | 29/447 |
| 4,719,074 | 1/1988 | Tsuno et al. | 419/5 |
| 4,719,075 | 1/1988 | Tsuno et al. | 419/5 |
| 4,722,630 | 2/1988 | Fang | 403/30 |
| 4,723,863 | 2/1988 | Tagaki et al. | 403/272 |
| 4,747,722 | 5/1988 | Kawaguchi et al. | 403/30 |
| 4,784,574 | 11/1988 | Tsuno et al. | 416/241 |
| 4,856,970 | 8/1989 | Oda et al. | 417/407 |
| 4,871,107 | 10/1989 | Yamada et al. | 228/122 X |
| 4,886,695 | 12/1989 | Mizuno et al. | 428/137 |
| 4,908,256 | 3/1990 | Oda et al. | 428/133 |
| 4,938,922 | 7/1990 | Mizuhara | 420/508 |
| 5,020,932 | 6/1991 | Boyd | 403/404 |

OTHER PUBLICATIONS

E. M. Dunn et al., "Analytical and Experimental Evaluation of Joining . . . for Advanced Heat Engine Applications", contract report submitted Apr. 1989 to U.S. Dept. of Energy.
S. Kang et al., "Issues in Ceramic-to-Metal Joining: An Investigation of Brazing a Silicaon Nitride-Based Ceramic to a Low Expansion Superalloy", *Cer. Bull.* 68, 1608-1617 (1989).
J. Selverian et al., "Mechanical Testing of . . . Brazed Joints", *Mat. Res. Soc. Extended Abstr. (EA-23)*, 57ff, (1990); Presentation, Boston, Mass, Nov. 29, 1990.
S. Kang et al., "Analytical and Experimental Evaluation of Joining Silicon Nitride-to-Metal for Advanced Heat Engine Applications", abstract and presentation at Automotive Development Technology Contractors Coordination Mtg., Dearborn, Mich., Oct. 22-25, 1990; *Proceedings of the Annual . . . Mtg.*, pp. 243, 161-171 (1991).
J. Selverian et al., "Torsion and Torsion Fatigue Testing . . . Brazed Joints", abstr., transprncies., presentn., Am. Cer. Soc. Conf., Cincinnati, Ohio, Apr. 28,-May 2, 1991.

Primary Examiner—Kenneth J. Ramsey
Attorney, Agent, or Firm—Frances P. Craig

[57] ABSTRACT

A ceramic-metal article including a ceramic rod, a metal rod, and a braze joining the ceramic and metal rods at a braze area of a coaxial bore in the metal rod. The bore gradually decreases in diameter, having an inward seat area sized for close sliding fit about the ceramic, a larger brazing area near the joint end, and a void area intermediate the braze and seat areas. The ceramic is seated without brazing in the bore seat area. The side wall between the brazing area and the metal outer surface is about 0.030–0.080 inch. The braze includes an inner braze layer, an outer braze layer, and an interlayer about 0.030–0.090 inch thick. A shoulder between the brazing and void areas supports the interlayer during bonding while preventing bonding between the void area and the ceramic member, leaving a void space between the void area and the ceramic member. A venting orifice extends generally radially through the metal member from the outer surface to the void space. The braze layers are palladium, platinum, gold, silver, copper, nickel, indium, chromium, molybdenum, niobium, iron, aluminum, or alloys thereof. Preferred is a gold-palladium-nickel brazing alloy. The interlayer is nickel, molybdenum, copper, tantalum, tungsten, niobium, aluminum, cobalt, iron, or an alloy thereof.

18 Claims, 3 Drawing Sheets

CERAMIC-METAL COMPOSITE ARTICLE AND JOINING METHOD

CONTRACT INFORMATION

This invention was made as a result of work under Contract No. DE-AC05-840R-21400 between the U.S. Department of Energy and Martin Marietta Energy Systems, Subcontract No. 86X-SB047C to GTE Laboratories Incorporated. The Government has certain rights in this invention.

BACKGROUND OF THE INVENTION

This invention relates to a ceramic-metal composite article and fabrication method therefor. In particular this invention relates to a design geometry and material system for a brazed joint between the ceramic and metal components of a ceramic-metal composite article for load bearing and high temperature applications.

Various ceramic materials have been proposed as replacements for metal component parts in high temperature environments, including the high temperature corrosive environments found in high fuel efficiency, high temperature internal combustion and gas turbine engines. Such replacements are commonly referred to as "ceramic heat engine components." Ceramics proposed as suitable for such use include, e.g., silicon nitride, silicon carbide, zirconia, and alumina, particularly as reinforced composite materials.

However, for economic, production, and other reasons, the ceramic normally is used for only those portions of the engine components actually exposed to the high temperature environment, while less heat resistant metal may be used for the component portions not so exposed. The result is a composite body including both ceramic and metal portions, requiring a strong, reliable joint between the two materials. For simplicity, these composite bodies are also referred to herein and in the appended claims as ceramic heat engine components. Typically, temperatures in the above-described engines rise from room temperature to about 1200° C. In such an engine, the ceramic-metal joint of, for example, a ceramic rotor will be exposed to temperatures of up to about 600°–650° C. A ceramic-to-metal joint for this application should withstand the high temperature corrosive environment of the engine, as well as the various stresses to which it is subjected in use.

A major problem in joining ceramics to metals is the thermal mismatch between the ceramic and metal materials. Thermal mismatch causes significant residual stress in the ceramic, possibly leading to catastrophic failure during production or in service.

Ceramic-metal joints have used various joining methods, e.g. glass frit, diffusion bonding, brazing, and mechanical shrink fit, and various joint geometries, e.g. butt, conical, and cylindrical joint geometries. The cylindrical joint has been most often associated with a mechanical shrink fit (press fit) technique. To effect a shrink fit, a relatively simple, straight cylindrical bore into the metal member is required. However, a shrink fit joint not only requires strict dimensional tolerances between the metal and ceramic members, but also limits the use temperature of the joint to a temperature far below the processing temperature of, usually, about 500° C.

Brazing has also been proposed as another potential joining technique for various ceramic-metal joints including the cylindrical joint. Brazing techniques potentially can ease the close machining tolerances required for shrink fit joint components, as well as provide superior performance in high temperature components. However, when brazing is used as a joining method, the straight, cylindrical bore normally used for a shrink fit joint causes another set of problems, e.g. gas entrapment, subsequent misalignment, and nonuniform bond area. Further, few joint geometries have been successfully designed specifically for the brazing approach to composite high temperature structural parts.

It would be of great benefit to the development of high fuel efficiency, high temperature ceramic engines, as well as other high performance technologies, if processing methods, joint designs and joint material systems could be developed to consistently produce reliable joints in ceramic-metal components, and if machining tolerances for ceramic and metal parts could be made less critical than those required for the shrink fit approach. Typically, such joints should fulfill performance requirements both at room temperature and at high temperatures.

SUMMARY OF THE INVENTION

The invention is a ceramic-metal article including a generally cylindrical ceramic member having a joint end and a radially outward surface of a diameter $D_1$; a generally cylindrical metal member having a joint end and a radially outward surface of a diameter $D_2$, $D_2$ being greater than $D_1$; and a braze joining the ceramic member and the metal member at a braze portion of a coaxial bore in the metal member. The bore extends inwardly from the metal member joint end, and has at least a brazing portion of an inside diameter $D_3$, a void portion of an inside diameter $D_4$, and a seat portion of an inside diameter $D_5$. The void portion is intermediate the braze portion and the seat portion. The ceramic member joint end is seated without brazing in the metal member bore seat portion. $D_5$ is selected for a close sliding fit about $D_1$; $D_3$ is greater than $D_5$; $D_4$ is intermediate $D_3$ and $D_5$; and $D_2$ is selected to result in a thickness $\Delta D = D_2 - D_3$ of a bore side wall between the brazing portion of the bore and the outer surface, $\Delta D$ being about 0.030–0.080 inch. The braze comprises an inner braze layer, an outer braze layer, and an interlayer about 0.030–0.090 inch thick intermediate the inner and outer braze layers. Diameter $D_4$ is selected to create an annular shoulder between the brazing bore portion and the void bore portion of a size to support the interlayer during bonding while substantially preventing bonding between the metal member void portion and the ceramic member by the braze, thus leaving an annular void space between the void portion and the ceramic member. A venting orifice extends generally radially through the metal member interconnecting the void space and the outer surface. The inner and outer braze layers each include a braze material selected from palladium, platinum, gold, silver, copper, nickel, indium, chromium, molybdenum, niobium, iron, aluminum, and alloys thereof. The interlayer includes (a) a ductile metal or alloy or (b) a metal or alloy which has a low thermal expansion coefficient.

In an alternate embodiment the invention is a ceramic metal joint including a generally cylindrical ceramic member having a joint end and a radially outward surface of a diameter $D_1$; a generally cylindrical metal member having a joint end and a radially outward surface of a diameter $D_2$, $D_2$ being greater than $D_1$; and a braze joining the ceramic member and the metal member at a braze portion of a coaxial bore in the metal member. The bore extends inwardly from the metal member joint end, and has at least a brazing portion of an inside diameter $D_3$, a void portion of an inside diameter $D_4$, and a seat portion of an inside diameter $D_5$. The void portion is intermediate the braze portion and the seat portion. The ceramic member joint end is seated without brazing in the metal member bore seat portion. $D_5$ is selected for a close sliding fit about $D_1$; $D_3$ is greater than $D_5$; $D_4$ is intermediate $D_3$ and $D_5$; and $D_2$ is selected to result in a thickness $\Delta D = D_2 - D_3$ of a bore side wall between the brazing portion of the bore and the outer surface, $\Delta D$ being about 0.030–0.080 inch. The braze comprises an inner braze layer, an outer braze layer, and an interlayer about 0.030–0.090 inch thick intermediate the inner and outer braze layers. Diameter $D_4$ is selected to create an annular shoulder between the brazing bore portion and the void bore portion of a size to support the interlayer during bonding while substantially preventing bonding between the metal member void portion and the ceramic member by the braze, thus leaving an annular void space between the void portion and the ceramic member. A venting orifice extends generally radially through the metal member interconnecting the void space and the outer surface. The inner and outer braze layers each include a braze material selected from palladium, platinum, gold, silver, copper, nickel, indium, chromium, molybdenum, niobium, iron, aluminum, and alloys thereof. The interlayer includes (a) a ductile metal or alloy or (b) a metal or alloy which has a low thermal expansion coefficient.

In another alternate embodiment the invention is a method of producing a ceramic-metal article. The article includes a generally cylindrical ceramic member having a joint end and a radially outward surface of a diameter $D_1$, a generally cylindrical metal member having a joint end and a radially outward surface of a diameter $D_2$, $D_2$ being greater than $D_1$, and a braze joining the ceramic member and the metal member. The method involves machining a coaxial bore into the metal member extending inwardly from its joint end, machining a venting orifice into the metal member extending generally radially from its outer surface into the void space, seating the ceramic member joint end in the metal member bore seat portion, and bonding the seated ceramic member to the coaxial bore braze portion using a braze including an inner braze layer, an outer braze layer, and an interlayer intermediate the inner and the outer braze layers. The coaxial bore has at least a brazing portion of an inside diameter $D_3$, a void portion of an inside diameter $D_4$, and a seat portion of an inside diameter $D_5$. The void portion is intermediate the braze portion and the seat portion. $D_5$ is selected for a close sliding fit about $D_1$. $D_3$ is greater than $D_5$. $D_4$ is intermediate $D_3$ and $D_5$. $D_2$ is selected to result in a thickness $\Delta D = D_2 - D_3$ of a bore side wall between the brazing portion of the bore and the outer surface, the wall thickness $\Delta D$ being about 0.030–0.080 inch. The inner and outer braze layers each include a braze material selected from palladium, platinum, gold, silver, copper, nickel, indium, chromium, molybdenum, niobium, iron, aluminum, and alloys thereof. The interlayer is about 0.030–0.090 inch thick and includes (a) a ductile metal or alloy or (b) a metal or alloy which has a low thermal expansion coefficient. Diameter $D_4$ is selected to create an annular shoulder between the brazing and void bore portions of a size to support the interlayer during bonding while substantially preventing bonding between the metal member void portion and the ceramic member by the braze, thus leaving an annular void space between the void portion and the ceramic member.

BRIEF DESCRIPTION OF THE DRAWINGS

For a better understanding of the present invention, together with other objects, advantages and capabilities thereof, reference is made to the following Description and appended claims, together with the Drawings, in which:

DETAILED DESCRIPTION OF THE PREFERRED EMBODIMENTS

The joint design and joint system described herein were determined with the assistance of a processing study, analytical mechanics, and finite element analysis, described further below. The advantages of this joint design are that reliable ceramic-metal joints can be made consistently in processing and that machining tolerances for the parts are not as critical as those required for a shrink fit approach. Also, the joints exhibit good performance at both room temperature and high temperatures.

The cylindrical, brazed ceramic-metal joint geometry described herein is designed to provide a strong joint between a ceramic, for example silicon nitride or silicon carbide, and a metal, for example Ni-based or Fe-based superalloys. The combination of joint configuration, interlayer thickness, and vent apertures described herein facilitates the joining process and provides a strong, reliable, heat resistant, ceramic-metal joint. This joint design is also suitable for joining other structural ceramics, as listed below, to metal, and is particularly advantageous when joining ceramics and metals having large differences in thermal expansion coefficients.

As mentioned above, the differences in thermal expansion between ceramic and metal materials result in the creation of large residual stresses in the vicinity of the joint, often leading to catastrophic failure of the ceramics, either during brazing or other manufacturing processes or when the residual stresses are exacerbated by the stresses encountered in use. Therefore, any improvement in ceramic-metal joint design must address the problem of residual stresses. The joint described herein minimizes residual stresses, resulting in very strong and reliable ceramic-metal composite articles.

Figure 1:
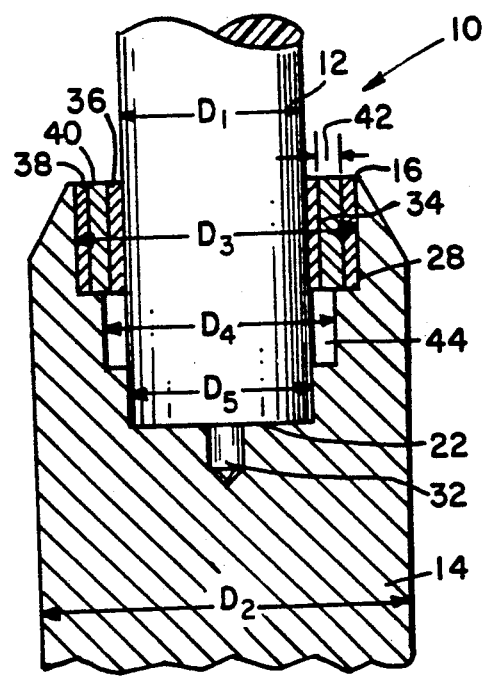
FIG. 1 is a schematic elevation, partly in section, of a brazed ceramic-metal joint in accordance with one embodiment of the invention.
Figure 2:
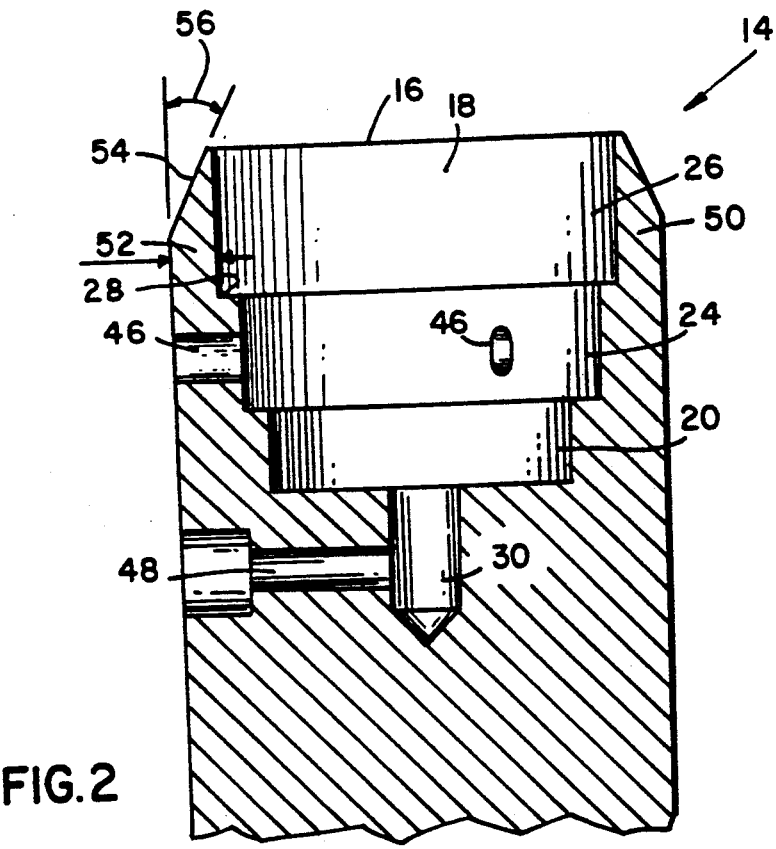
FIG. 2 is a schematic elevation in section, illustrating in more detail the metal member and stepped bore of the embodiment of FIG. 1.

FIGS. 1 and 2 schematically illustrate an exemplary ceramic-metal article. In FIG. 1, composite ceramic-metal turbocharger rotor 10 is made up of cylindrical ceramic shaft 12 and cylindrical metal shaft 14. Joint end 16 of metal shaft 14 includes stepped coaxial bore 18 (FIG. 2), which in turn includes coaxial cylindrical sleeve bore 20 machined to receive joint end 22 of ceramic shaft 12 in a close sliding fit relationship. Additional coaxial cylindrical bores 24 and 26, respectively of progressively larger diameter and closer to joint end 16 than sleeve bore 20, are also machined into end 16, providing coaxial, annular shoulder 28 above sleeve bore 20.

The close sliding fit relationship between sleeve bore 20 and end 22 provides alignment and centering for the rotor components during the brazing process, and stability for the joined composite rotor. Conveniently, as an alternative alignment, centering, and stabilizing means to the close sliding fit between sleeve bore 20 and end 22 or in addition to it, coaxial bore 30 may be machined into end 16 below sleeve bore 20, of smaller diameter and closer to joint end 16 than sleeve bore 20, to receive coaxial alignment, centering, and stabilizing pin 32 of end 22 in a close sliding fit relationship.

Shoulder 28 supports annular braze-interlayer-braze combination 34, providing easier positioning of the braze foils and interlayer materials during the brazing process. The width of the shoulder is preferably about two thirds of the interlayer thickness. Braze-interlayer-braze combination 34 is made up of inner layer 36 and outer layer 38 of brazing material separated by interlayer 40. Conveniently, the braze layers may be cut and shaped from brazing foil material, and the braze layers and interlayer positioned within bore 26 before bonding of the joint. Alternatively, these materials may be applied by other means, for example as a preform.

The brazing material may be any brazing metal or alloy suitable for bonding the ceramic of shaft 12 and the metal of shaft 14 or, alternatively, different materials may be used for inner layer 36 and outer layer 38, each selected to form a strong bond with the materials it contacts. Interlayer 40 serves to accommodate stress developed between ceramic shaft 12 and metal shaft 14 due to differences in thermal expansion coefficients between the two materials, and may be any metal or alloy which is ductile or which has a low thermal expansion coefficient. The materials of inner layer 36 and interlayer 40 and of interlayer 40 and outer layer 38 are selected to be strongly bonding to and compatible with one another.

Thickness 42 of interlayer 40 is an important factor in the reliability of the joint, and must be sufficient to minimize joint failure. The most effective range for thickness 42 of interlayer 40 was determined using a finite element analysis (FEA) computer program adapted from ABAQUS, a general purpose FEA code available from Hibbitt, Karlsson & Sorensen, Providence, RI.

Figure 3:
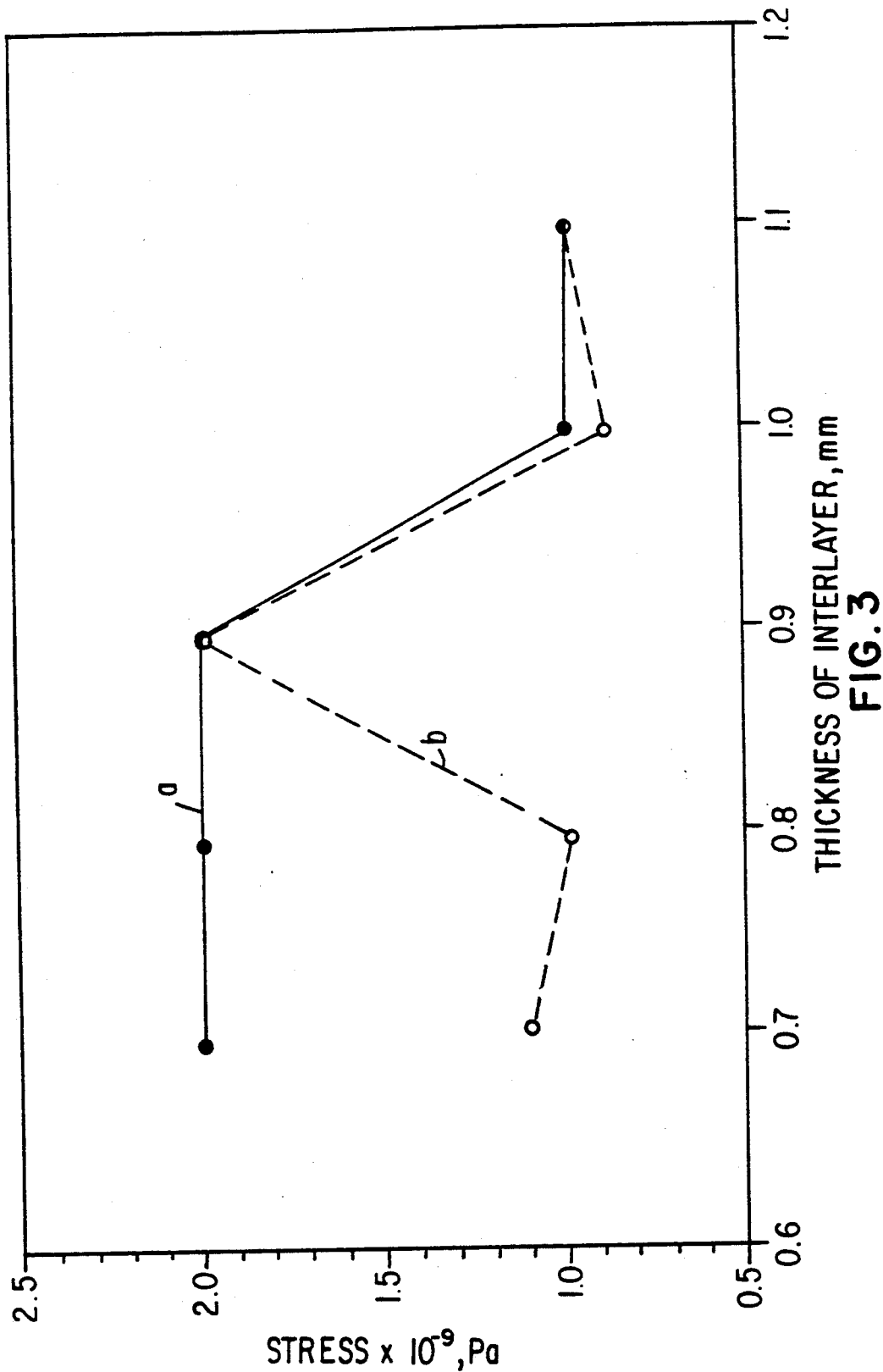
FIG. 3 is a graphical representation of the relationship between the joint interlayer thickness and the residual stress developed at the ceramic-metal interface of an article in accordance with another embodiment of the invention.

FEA was used to mathematically model and analyze stresses induced in a silicon nitride shaft of 0.50 inch diameter bonded to a 0.766 inch diameter Incoloy 909 metal shaft using a Au-Pd-Ni/nickel/Au-Pd-Ni braze-interlayer-braze combination at various interlayer thicknesses. As shown in FIG. 3, there is a sharp increase in the residual stress developed at the ceramic-metal interface when the interlayer thickness is below about 1 mm or 0.040 inch, reaching an unacceptable level at about 0.030 inch. The residual stress is described in FIG. 3 in terms of the maximum principal stress, shown at (a), and the Mises equivalent stress, shown at (b). As used herein, the terms "layer" and "interlayer" are intended to include a single layer or a plurality of layers making up braze layer 36 or 38 or interlayer 40. The terms "maximum principal stress" and "Mises equivalent stress" are terms used in the art to denote two ways of expressing the residual stress, in this instance that developed at the ceramic-metal interface.

Based on this study, the preferred total thickness of the interlayer is about 0.030-0.090 inch; the most preferred thickness is about 0.050-0.070 inch. Above about 0.090 inch, the high temperature characteristics of the ductile interlayer materials may adversely affect the high temperature performance of the joint.

Examples of suitable joint systems as described herein are: silicon nitride-6%yttria ceramic (PY6 TM ) bonded to Incoloy ®909 alloy with a Au-5%Pd-2%Ni braze and a nickel or a molybdenum interlayer; or silicon carbide ceramic bonded to Inconel ® 718 with the same Au-5%Pd-2%Ni braze or a Palniro braze (34%Pd-36%Ni-30%Au) and a molybdenum interlayer. Suitable materials for the article described herein include, but are not limited to:

Metals—Inconel 600, Inconel 625, Inconel 718, Incoloy 800, Incoloy 800HT, Incoloy 903, Incoloy 907, Incoloy 909, other nickel-base, iron-based, or cobalt-based superalloys, ultrahigh strength steels or stainless steels, titanium-based alloys, or refractory alloys based on tungsten, molybdenum, tantalum, and/or niobium.

Ceramics—silicon nitride, silicon carbide, hard refractory carbides or nitrides such as titanium carbide or the like, alumina, zirconia, hard refractory borides such as $TiB_2$ or the like, boron carbide, or composites or solid solutions based on these.

Brazes—Cusil TM , Cusil ABA TM , Incusil TM , Nioro TM , Palni TM , Palniro TM , or metals such as platinum, gold, silver, palladium, copper, nickel, indium, chromium, molybdenum, niobium, iron, and/or aluminum, or ductile alloys based on these, and including those alloys containing active metals to improve wetting properties.

Interlayers - tungsten, molybdenum, tantalum, niobium, copper, nickel, aluminum, cobalt, iron, or alloys based on these.

The term "ceramic" as used herein and in the appended claims, as well as the specific ceramics named herein, are intended to include both monolithic and composite ceramic materials in which these ceramics are the predominant component. The terms Incoloy and Inconel are registered trademarks of Huntington Alloys, Inc., Huntington, W. Va. 25720. Incoloy 909 is a Fe-Ni-Co-Nb-based superalloy; Inconel 718 is a Ni-Cr-based superalloy. PY6, Cusil, Cusil ABA, Incusil, Nioro, Palni, and Palniro are trademarks of GTE Products Corporation; the brazes being available from GTE Wesgo, Belmont, Calif. The combination of various materials required for a joint system as described herein are selected according to criteria described elsewhere herein and for chemical and processing compatibility with one other.

Figure 4:
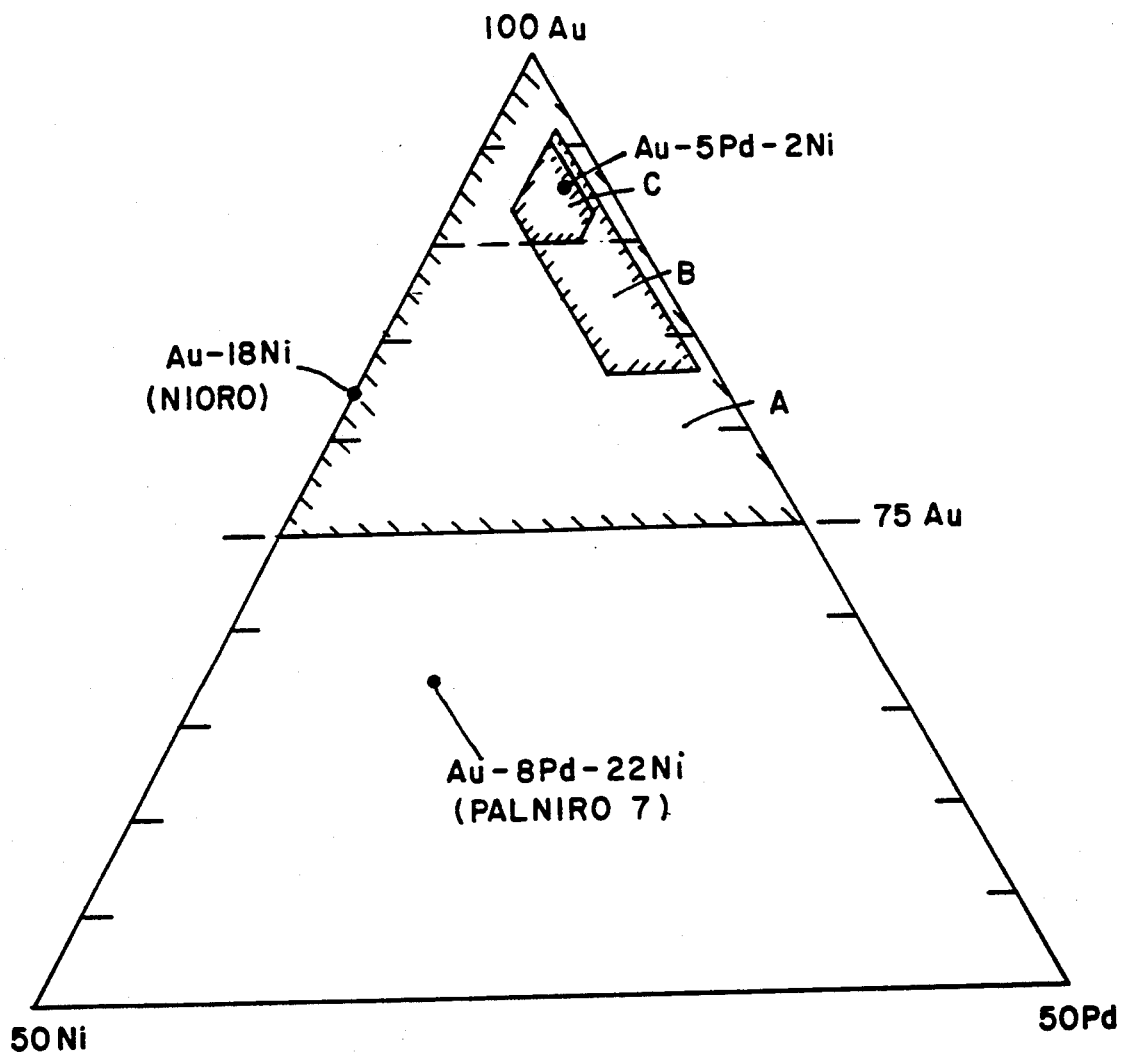
FIG. 4 is a ternary phase diagram illustrating braze alloy compositions in accordance with preferred embodiments of the invention.

A particularly preferred joint system which optimizes the capabilities of the joint design described herein is a combination of a silicon nitride-based ceramic shaft, e.g. a PY6 or PY6-based composite shaft, with an Incoloy or an Inconel metal shaft of the geometry described herein. In this preferred system, these materials are brazed to one another using a Au-Pd-Ni brazing alloy of at least 75 weight % gold, remainder palladium and/or nickel, as shown by the largest shaded area, designated "A", in FIG. 4, and an interlayer of molybdenum or, more preferred, nickel or their alloys. A more preferred braze alloy is similar to that described in U.S. Pat. No. 4,938,922, and contains about, in weight %, 83-96% gold, 3-10% palladium, and 0.5-5% nickel, as shown by the intermediate sized shaded area, designated "B" in FIG. 4; this alloy optionally may contain 0-2% titanium. Most preferred is a braze alloy of 90-96% gold, 3-7% palladium, and 1-5% nickel, as shown by the smallest shaded area, designated "C" in FIG. 4.

The support of braze-interlayer-braze combination 34 by shoulder 28 during the brazing process as well as the size of bore 24 provide void space 44 in bore 24. Void space 44 prevents bonding between ceramic shaft 12 and metal shaft 14 as braze flows downward during the bonding process, providing control of the size of the bonding area. For example, the preferred bonding area for a 0.5 inch diameter shaft is about 2 cm².

Conveniently, vent apertures 46 may be machined into shaft 14 to communicate with void space 44, providing escape for any gases created during the brazing process, maintaining the integrity of the brazed joint by avoiding the entrapment of such gases. From one to several apertures 46 may be provided, but two or three apertures are preferred. Bore 30 may also be provided with vent aperture 48, whether or not pin 32 is provided on shaft end 22, and thus serves to further vent the void space below the braze area. Vent aperture 48 may conveniently be of a size suitable for insertion of a thermocouple, to aid in monitoring of the brazing process.

Side wall 50 surrounds bore 26 and braze-interlayer-braze combination 34. Thickness 52 of sidewall 50 is another important factor in the reliability of the joint described herein. The thickness of side wall 50 must be optimized in terms of torsional strength for increased load bearing and reduction of residual stress. Thickness 52 varies somewhat for different metals, but generally a thickness in the range of about 0.030-0.080 inch is preferred, particularly for an exemplary Incoloy 909 metal shaft.

A preferred thickness for the metal shaft side wall surrounding the braze-interlayer-braze combination was calculated for typical metal shafts machined from Incoloy 909 and Inconel 718 superalloy. As shown in Table I, below, the torsional strength for Incoloy 909 and for Inconel 718 at a 0.375 in gauge section were measured at room temperature and 580 in-lb torsional moment, and at 650° C. and 400 in-lb torsional moment.

TABLE I

| Material | Test Conditions | Torque, in-lb | Shear Yield Strength, psi | Rotation at Yield, ° |
|---|---|---|---|---|
| Incoloy 909 | RT torsion | 580 | 56,015 | 2.0 |
|  | 650° C. torsion | 400 | 38,631 | 2.3 |
| Inconel 718 | RT torsion | 550 | 53,118 | 2.5 |
|  | 650° C. torsion | 480 | 46,437 | 2.3 |

The preferred minimum values for wall thickness 52 for a metal shaft may be calculated using the relationship between torque and shear stress in a thin wall tube, $$\tau = \frac{M_T r}{J} \quad (1)$$

where $\tau$ is the shear strength, $M_T$ is the measured torsional strength, r is the radius of the metal shaft, and J is the polar moment of inertia $$J = \frac{\pi D^4}{32} \quad (2)$$

and D is the diameter of the metal shaft. Table II shows the calculated values for shear stress exerted on metal walls of various thickness as a function of applied torque.

TABLE II

| Wall Thickness, inch | Torque, in-lb | Shear Stress, ksi |
|---|---|---|
| 0.010 | 180 | 27.4 |
|  | 260 | 39.6 |
|  | 340 | 51.8 |
| 0.020 | 180 | 13.5 |
|  | 260 | 19.5 |
|  | 340 | 25.5 |
| 0.030 | 180 | 8.8 |
|  | 260 | 12.8 |
|  | 340 | 16.7 |
| 0.040 | 180 | 6.5 |
|  | 260 | 9.4 |
|  | 340 | 12.3 |
| 0.050 | 180 | 5.1 |
|  | 260 | 7.4 |
|  | 340 | 9.7 |
| 0.060 | 180 | 4.2 |
|  | 260 | 6.1 |
|  | 340 | 7.9 |
| 0.070 | 180 | 3.5 |
|  | 260 | 5.1 |
|  | 340 | 6.7 |
| 0.080 | 180 | 3.0 |
|  | 260 | 4.4 |
|  | 340 | 5.7 |
| 0.090 | 180 | 2.6 |
|  | 260 | 3.8 |
|  | 340 | 5.0 |

Based on Table I, it was determined that the preferred wall thickness for the Incoloy 909 metal component is in the range of about 0.030-0.080 inch. Depending on the properties of the metal, the range can vary somewhat, but this range is suitable for most common metals. For example, an 0.080 inch wall thickness was the approximate upper limit for high thermal expansion Inconel 718. Above the recommended thickness range, material is wasted and the residual stress is increased.

Tapered edge 54 of sidewall 50, although not critical to the performance of the joint, is the preferred configuration for optimum performance. The longer the tapered portion of the surrounding metal member, the lower the residual stress. The length of the tapered portion and the thinness of the side wall, however, are limited by the load bearing capacity of the metal used to form the shaft. Taper angle 56 of tapered edge 54 is preferably about 20°-45°, and most preferably about 30°. Also most preferably, the taper does not intersect the bore, leaving an annular shoulder at the joint end of the shaft.

The following Examples are presented to enable those skilled in the art to more clearly understand and practice the present invention. These Examples should not be considered as a limitation upon the scope of the present invention, but merely as being illustrative and representative thereof.

EXAMPLE 1

Room Temperature Torsion Testing—Incoloy 909/PY6 Samples

Several ceramic-metal articles of the type described above were made by joining a ceramic shaft to a metal shaft. Each ceramic shaft, 0.5 inch diameter and 4 inches long, was sintered and hot isostatically pressed (HIPed) from a PY6 silicon nitride powder mixture including 6 w/o (weight percent) yttria as a densification aid. Each metal shaft, 0.766 inch diameter and 7 inches long, was machined from Incoloy 909. The bore diameters in the metal shaft, as indicated in FIG. 1 by reference numerals 20, 24, and 26, were 0.501, 0.5785, and 0.641 inches respectively. The braze area of the ceramic shaft was coated with a thin titanium coating by evaporation to improve bonding of the brazing alloy to the ceramic. The ceramic and metal shafts were then brazed at 1180° C. for 10 minutes in vacuum using a Au-5%Pd-2%Ni brazing foil and a 0.0625 inch nickel interlayer material. The samples were then torsion tested.

The room temperature fracture strength of the brazed Incoloy 909/PY6 samples was measured using a MTS (Material Testing Systems, Minneapolis, Minn.) servo-/hydraulic model 646.25S Axial/Torsion machine with zero axial load. The brazed metal and ceramic shafts were each gripped firmly and torque was applied to the samples at room temperature, gradually increasing at a rate of 0.2°/sec until fracture occurred. The torsion test results on these samples are listed in Table III, showing the torque, bending moment, and rotation at which failure occurred. The shear stress shown in Table III was calculated according to Equations 1 and 2, above. As shown in Table III, the strength of all samples exceeded the approximately 185 in-lbs torque normally found in engine operation, the strength of most samples being more than double that required.

EXAMPLE 2

Room Temperature Torsion Testing—Inconel 718/PY6 Samples

Samples were prepared and tested as described for Example 1 except that the metal shaft was Inconel 718 and the interlayer was molybdenum. The results of these tests are shown in Table III. The Inconel 718/PY6 joint exhibited good fracture strength for a combination of these materials, although the strength was lower than that of the samples of Example 1. The decrease is due to the higher residual stress developed by Inconel 718 compared to that of Incoloy 909, which has a lower thermal expansion coefficient.

EXAMPLE 3

Room Temperature Torsion Testing—Incoloy 909/SiC Samples

Samples were prepared and tested as described for Example 1 except that the ceramic shaft was prepared by sintering of a silicon carbide powder including about 0.5% boron as a sintering aid, and the interlayer was molybdenum. The results of these tests are also shown in Table III. The silicon carbide/Incoloy 909 samples exhibit lower strength than the samples of Example 1, presumably due to the lower fracture toughness of silicon carbide relative to silicon nitride, rather than due to the joint system itself.

TABLE III

| Torque, in-lb | Shear Strength, psi | Bending Moment, in-lb | Rotation at Fracture, ° | Fracture Mode |
|---|---|---|---|---|
| Example 1 - Incoloy 909/PY6: | | | | |
| 539 | 21,961 | 63 | 2.22 | break in ceramic |
| 862 | 35,162 | 126 | 3.52 | break in ceramic |
| 470 | 19,150 | 99 | 1.98 | break in ceramic |
| 267 | 10,878 | 117 | 1.15 | break in ceramic |
| 528 | 21,513 | 90 | 1.05 | break in ceramic |
| Example 2 - Inconel 718/PY6: | | | | |
| 108 | 4,400 | 225 | 0.38 | break in ceramic |
| 350 | 14,260 | 117 | 1.19 | break in ceramic |
| 200 | 8,148 | 153 | 0.70 | break in ceramic |
| 453 | 18,457 | 144 | 0.80 | break in ceramic |
| 360 | 14,667 | 144 | 0.64 | break in ceramic |
| Example 3 - Incoloy 909/SiC: | | | | |
| 106* | 4,324 | 162 | 0.25 | break in ceramic |
| 70 | 2,852 | 54 | 0.25 | break in ceramic |
| 68 | 2,771 | 54 | 0.30 | break in ceramic |

*Sample heated to 650°–700° C., then gripped in the torsion testing apparatus before cooling, to realign the sample for testing.

EXAMPLE 4

Thermal Fatigue Tests—Incoloy 909/PY6

Several Incoloy 909/PY6 samples were prepared and brazed as described above for Example 1. The joints were identical to those of Example 1 except that the metal and ceramic sections were only 1" long. The performance of these brazed joints were evaluated in terms of thermal fatigue to assess the effects of repeated expansion and contraction of the structural alloy and interlayer materials due to temperature fluctuation on the cracking behavior of the ceramic.

The initial crack distribution and subsequent propagation were checked with microfocus x-ray after brazing and after 10, 100, and 1,000 thermal cycles between 335° and 650° C. The Incoloy 909/$Si_3N_4$ joints survived all 1,000 cycles with no evidence of cracking within the detection limit of the x-ray equipment (40 μm).

EXAMPLE 5

Mechanical Fatigue Tests—Incoloy 909/PY6

A ceramic-metal joint for engine applications also undergoes severe mechanical fatigue during the expected service life. The braze joint area of a rotor/shaft assembly experiences many stresses. Torsional loading is the most severe. A mechanical fatigue test cycle was developed to simulate the stresses developed in a typical gas turbine engine. A typical torque experienced at minimum and maximum idle speeds is 35 in-lb and 185 in-lb, respectively; a typical cycle time, from minimum to maximum, is ⅓ seconds. These values initially were selected for the mechanical fatigue tests.

Several Incoloy 909/PY6 joints were fabricated as described above in Example 1 from the same materials, and were torsion fatigue tested at room-temperature. The brazed joints were each first fatigued at room-temperature for 1,000 cycles between 35 in-lb and 185 in-lb at a ⅓ sec cycle time. None of the joints failed. One of these fatigued joints was selected randomly and was further fatigued at room-temperature and at the same cycle rate and torque amplitude, with the intent of continuing fatigue testing until failure occurred. After 1,000,000 cycles, the joint was still intact and testing was discontinued. The joint showed no signs of degradation; the rotation required to induce 35 and 185 in/lbs of torque was unchanged from the 0.32° required at the start of the test. The results of these tests are shown in Table IV, below.

Other Incoloy 909/PY6 joints, fabricated as described above in Example 1 using the same materials, were similarly fatigued, but were cycled between 278 in-lb and 53 in-lb, and between 370 in-lb and 70 in-lbs respectively. These joints also survived 1,000,000 cycles at room temperature. The results of these tests are also shown in Table IV, below.

EXAMPLE 6

Fracture Strength Tests of Previously Fatigued Samples—Incoloy 909/PY6

Some of the samples from Example 5 were further tested to determine the fracture strength of the pre-torsion tested samples. The fracture strength was determined by the method described in Example 1, except that the testing temperature was 500° C. The torque was gradually increased until fracture occurred. The fracture strengths at 500° C. for these further tested samples is shown in Table IV. The samples exhibited good fracture strength even after torsion testing.

EXAMPLE 7

Mechanical Fatigue Tests—Inconel 718/PY6

Several Inconel 718/PY6 joints were fabricated as described above in Example 2 from the same materials, and were torsion fatigue tested at room-temperature as described above for Example 5. The brazed joints were each fatigued at room-temperature for 1,000 cycles between 35 in-lb and 185 in-lb at a ⅛ sec cycle time. None of the joints failed. The results of these tests are shown in Table IV, below.

TABLE IV

| Torque, in-lb | Bending Moment, in-lb | Rotation, ° | Cycles to Failure | 500° C. Torsion at Failure, in-lb |
|---|---|---|---|---|
| Examples 5 and 6 - Incoloy 909/PY6: | | | | |
| 185-35 | 180 | ±0.31 | >1,000* | — |
| 185-35 | 171 | ±0.32 | >1,000* | — |
| 185-35 | 189 | ±0.31 | >1,000* | — |
| 185-35 | 234 | ±0.32 | >1,000* | 440** |
| 185-35 | 144 | ±0.32 | >1,000,000 | 220** |
| 277-53 | — | — | >1,000,000 | 135** |
| 370-70 | — | — | >1,000,000 | — |
| Example 7 - Inconel 718/PY6: | | | | |
| 185-35 | 225 | — | >1,000* | |
| 185-35 | 162 | ±0.26 | >1,000 | |

*Sample heated to 650°-700° C., then gripped in the torsion testing apparatus before cooling, to realign the sample for testing.
**Samples were fatigued for 1000-1,000,000 cycles before torsion testing at 500° C.

The ceramic-metal joint and article described above are suitable for such applications as ceramic heat engine components and other structural composite parts subjected to high temperature and high stress environments, and have been shown to withstand repeated temperature and stress cycling for long and reliable service life.

While there have been shown and described what are at present considered the preferred embodiments of the invention, it will be obvious to those skilled in the art that various changes and modifications can be made therein without departing from the scope of the invention as defined by the appended claims.

We claim:

1. A ceramic-metal article comprising:

a generally cylindrical ceramic member having a joint end and a radially outward surface of a diameter $D_1$;

a generally cylindrical metal member having a joint end, a radially outward surface of a diameter $D_2$, $D_2$ being greater than $D_1$, and a coaxial bore extending inwardly from said joint end, said coaxial bore having at least a brazing portion of an inside diameter $D_3$, a void portion of an inside diameter $D_4$, and a seat portion of an inside diameter $D_5$; wherein said void portion is intermediate said braze portion and said seat portion, said ceramic member joint end is seated without brazing in said metal member bore seat portion, $D_5$ is selected for a close sliding fit about $D_1$, $D_3$ is greater than $D_5$, $D_4$ is intermediate $D_3$ and $D_5$, and $D_2$ is selected to result in a thickness $\Delta D = D_2 - D_3$ of a bore side wall between said brazing portion of said bore and said outer surface, said wall thickness $\Delta D$ being about 0.030–0.080 inch; and a braze joining said ceramic member and said metal member bore braze portion, said braze comprising an inner braze layer, an outer braze layer, and an interlayer about 0.030–0.090 inch thick intermediate said inner and said outer braze layers, wherein said diameter $D_4$ is selected to create an annular shoulder between said brazing bore portion and said void bore portion of a size to support said interlayer during said bonding step while substantially preventing bonding between said metal member void portion and said ceramic member by said braze, thus leaving an annular void space between said void portion and said ceramic member, a venting orifice extends generally radially through said metal member interconnecting said void space and said outer surface, said inner braze layer and said outer braze layer each comprise a braze material selected from the group consisting of palladium, platinum, gold, silver, copper, nickel, indium, chromium, molybdenum, niobium, iron, aluminum, and alloys thereof, and said interlayer comprises (a) a ductile metal or alloy or (b) a metal or alloy which has a low thermal expansion coefficient.

2. An article in accordance with claim 1 wherein said metal member comprises a nickel-based or iron-based superalloy; said ceramic member comprises a silicon nitride-based ceramic; said braze material of said inner and outer braze layers is of the composition in weight percent: 75–99% gold, 0–25% palladium, and 0–25% nickel; and said interlayer is nickel or molybdenum.

3. An article in accordance with claim 2 wherein said said ceramic member comprises a silicon nitride-based ceramic of the composition in weight percent: about 6% yttria, remainder silicon nitride; said braze material of said inner and outer braze layers is of the approximate composition in weight percent: 90–96% gold, 3–7% palladium, and 1–5% nickel; and said interlayer is nickel.

4. An article in accordance with claim 1 wherein said radially outward surface of said metal member includes a beveled portion tapering toward said metal member joint end at an angle of about 20°–45°.

5. An article in accordance with claim 4 wherein $D_1 \approx 0.5$ inch, $D_2 \approx 0.77$ inch, $D_3 \approx 0.64$ inch, $D_4 \approx 0.58$ inch, $D_5-D_1 \approx 0.001$ inch, and the thickness of said interlayer is about 0.06 inch.

6. An article in accordance with claim 5 wherein said braze consists essentially of a gold-palladium-nickel alloy and said interlayer consists essentially of nickel or molybdenum or their alloys.

7. An article in accordance with claim 1 wherein said interlayer is selected from the group consisting of nickel, molybdenum, copper, tantalum, tungsten, niobium, aluminum, cobalt, iron, and alloys thereof.

8. An article in accordance with claim 7 wherein said article is a ceramic heat engine component.

9. A ceramic-metal joint comprising:
a generally cylindrical ceramic member having a joint end and a radially outward surface of a diameter $D_1$;
a generally cylindrical metal member having a joint end, a radially outward surface of a diameter $D_2$, $D_2$ being greater than $D_1$, and a coaxial bore extending inwardly from said joint end, said coaxial bore having at least a brazing portion of an inside diameter $D_3$, a void portion of an inside diameter $D_4$, and a seat portion of an inside diameter $D_5$; wherein
said void portion is intermediate said braze portion and said seat portion,
said ceramic member joint end is seated without brazing in said metal member bore seat portion,
$D_5$ is selected for a close sliding fit about $D_1$,
$D_3$ is greater than $D_5$,
$D_4$ is intermediate $D_3$ and $D_5$,
$D_2$ is selected to result in a thickness $\Delta D = D_2 - D_3$ of a bore side wall between said brazing portion of said bore and said outer surface, said wall thickness $\Delta D$ being about 0.030-0.080 inch; and
a braze joining said ceramic member and said metal member bore braze portion, said braze comprising an inner braze layer, an outer braze layer, and an interlayer about 0.030-0.090 inch thick intermediate said inner and said outer braze layers, wherein said diameter $D_4$ is selected to create an annular shoulder between said brazing bore portion and said void bore portion of a size to support said interlayer during said bonding step while substantially preventing bonding between said metal member void portion and said ceramic member by said braze, thus leaving an annular void space between said void portion and said ceramic member,
a venting orifice extends generally radially through said metal member interconnecting said void space and said outer surface,
said inner braze layer and said outer braze layer each comprise a braze material selected from the group consisting of palladium, platinum, gold, silver, copper, nickel, indium, chromium, molybdenum, niobium, iron, aluminum, and alloys thereof, and said interlayer comprises (a) a ductile metal or alloy or (b) a metal or alloy which has a low thermal expansion coefficient.

10. A joint in accordance with claim 9 wherein said radially outward surface of said metal member joint end includes a beveled portion tapering toward said joint end at an angle of about 20°-45°.

11. A joint in accordance with claim 10 wherein $D_1 \approx 0.5$ inch, $D_2 \approx 0.77$ inch, $D_3 \approx 0.64$ inch, $D_4 \approx 0.58$ inch, $D_5-D_1 \approx 0.001$ inch, and the thickness of said interlayer is about 0.06 inch.

12. A joint in accordance with claim 11 wherein said braze consists essentially of a gold-palladium-nickel alloy and said interlayer consists essentially of nickel or molybdenum or their alloys.

13. An article in accordance with claim 9 wherein said interlayer is selected from the group consisting of nickel, molybdenum, copper, tantalum, tungsten, niobium, aluminum, cobalt, iron, and alloys thereof.

14. A method of producing a ceramic-metal article comprising a generally cylindrical ceramic member having a joint end and a radially outward surface of a diameter $D_1$, a generally cylindrical metal member having a joint end and a radially outward surface of a diameter $D_2$, $D_2$ being greater than $D_1$, and a braze joining said ceramic member and said metal member, said method comprising the steps of:
machining a coaxial bore into said metal member extending inwardly from said joint end, said coaxial boring having at least a brazing portion of an inside diameter $D_3$, a void portion of an inside diameter $D_4$, and a seat portion of an inside diameter $D_5$, wherein said void portion is intermediate said braze portion and said seat portion, $D_5$ is selected for a close sliding fit about $D_1$, $D_3$ is greater than $D_5$, $D_4$ is intermediate $D_3$ and $D_5$, and $D_2$ is selected to result in a thickness $\Delta D = D_2 - D_3$ of a bore side wall between said brazing portion of said bore and said outer surface, said wall thickness $\Delta D$ being about 0.030-0.080 inch;
machining a venting orifice into said metal member extending generally radially from said outer surface into void space,
seating said ceramic member joint end in said metal member bore seat portion; and
bonding said seated ceramic member to said coaxial bore braze portion using a braze comprising an inner braze layer, an outer braze layer, and an interlayer about 0.030-0.090 inch thick intermediate said inner and said outer braze layers, wherein said inner braze layer and said outer braze layer each comprise a braze material selected from the group consisting of palladium, platinum, gold, silver, copper, nickel, indium, chromium, molybdenum, niobium, iron, aluminum, and alloys thereof, and said interlayer comprises (a) a ductile metal or alloy or (b) a metal or alloy which has a low thermal expansion coefficient;
wherein said diameter $D_4$ is selected to create an annular shoulder between said brazing bore portion and said void bore portion of a size to support said interlayer during said bonding step while substantially preventing bonding between said metal member void portion and said ceramic member by said braze, thus leaving an annular void space between said void portion and said ceramic member.

15. A method in accordance with claim 14 further comprising the step of tapering said radially outward surface of said metal member to form a beveled portion tapering toward said joint end at an angle of about 20°-45°.

16. A method in accordance with claim 15 wherein $D_1 \approx 0.5$ inch, $D_2 \approx 0.77$ inch, $D_3 \approx 0.64$ inch, $D_4 \approx 0.58$ inch, $D_5-D_1 \approx 0.001$ inch, and the thickness of said interlayer is about 0.06 inch.

17. A method in accordance with claim 16 wherein said braze consists essentially of a gold-palladium-nickel alloy and said interlayer consists essentially of nickel or molybdenum or their alloys.

18. A method in accordance with claim 14 wherein said interlayer is selected from the group consisting of nickel, molybdenum, copper, tantalum, tungsten, niobium, aluminum, cobalt, iron, and alloys thereof.

* * * * *